(12) United States Patent
Asami et al.

(10) Patent No.: US 7,561,794 B2
(45) Date of Patent: Jul. 14, 2009

(54) DIGITAL CAMERA AND IMAGE-SHARING METHOD

(75) Inventors: Shuji Asami, Shizuoka (JP); Masao Kobayashi, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 606 days.

(21) Appl. No.: 11/419,772

(22) Filed: May 23, 2006

(65) Prior Publication Data
US 2007/0047950 A1 Mar. 1, 2007

(30) Foreign Application Priority Data
Aug. 24, 2005 (JP) ............... 2005-242173

(51) Int. Cl.
*G03B 17/48* (2006.01)
*H04N 5/76* (2006.01)

(52) U.S. Cl. .................................. 396/429; 348/231.2
(58) Field of Classification Search ................. 396/310, 396/429; 348/207.1, 211.1, 211.3, 222.1, 348/231.2, 231.3
See application file for complete search history.

(56) References Cited

U.S. PATENT DOCUMENTS

| | | | |
|---|---|---|---|
| 5,760,917 A * | 6/1998 | Sheridan | 358/442 |
| 5,864,684 A * | 1/1999 | Nielsen | 709/206 |
| 7,173,651 B1 * | 2/2007 | Knowles | 348/207.1 |
| 7,305,233 B2 * | 12/2007 | Paul et al. | 455/418 |
| 2002/0147985 A1 * | 10/2002 | Miyajima et al. | 725/109 |
| 2003/0103144 A1 * | 6/2003 | Sesek et al. | 348/207.1 |
| 2005/0246432 A1 * | 11/2005 | Iijima et al. | 709/223 |
| 2008/0022210 A1 * | 1/2008 | Izumino et al. | 715/731 |

FOREIGN PATENT DOCUMENTS

JP 2003-087615 3/2003

* cited by examiner

*Primary Examiner*—Rodney E Fuller
(74) *Attorney, Agent, or Firm*—Pamela R. Crocker

(57) ABSTRACT

Image data captured by digital cameras are shared among the digital cameras. Image data captured by digital cameras constituting members of an image-sharing group are shared, by way of a network, within the image-sharing group. Every time captured image data are output, the digital camera generates for each of the members distribution information, including a storage source directory, a distribution destination address, and a storage destination directory, all pertaining to the image data, by reference to a group list where member information is registered for each of the members, including a distribution destination address and a storage destination directory, to thus generate a distribution list having respective pieces of distribution information registered therein. Further, the digital camera sequentially reads distribution information from the distribution list and distributes the image data to respective other digital cameras, which constitute the members, on the basis of the read distribution information.

3 Claims, 14 Drawing Sheets

DIGITAL CAMERA AND IMAGE-SHARING METHOD

FIELD OF THE INVENTION

The present invention relates to a digital camera which can communicate with another digital camera by way of a network.

BACKGROUND OF THE INVENTION

Conventional techniques in this field include, e.g., a technique described in Japanese Patent Publication 2003-87615. According to this technique, a plurality of digital cameras are configured as a single group, and one digital camera belonging to this group is determined as a typical camera. The typical camera gathers image data captured by the other digital cameras belonging to the group, to thereby generate one cohesive group of image data.

According to the technique described in Japanese Patent Publication 2003-87615, the digital camera set as a typical camera gathers and integrates the image data captured by the other digital cameras. Therefore, the other digital cameras, which are not set as the typical camera, cannot immediately ascertain the thus-integrated group of image data.

SUMMARY OF THE INVENTION

Accordingly, the present invention enables sharing of image data, which are captured by respective digital cameras, among the digital cameras.

The present invention provides a digital camera which shares, within an image-sharing group by way of a network, image data captured by digital cameras constituting members of the image-sharing group, the digital camera comprising:

an imaging circuit for outputting image data obtained by capturing a subject;

a distribution list generation module which generates for each of the members of the group, every time image data are output from the capturing circuit, distribution information, including a storage source directory, a distribution destination address, and a storage destination directory, all pertaining to the image data, by reference to a group list where member information is registered for each of the members, including a distribution destination address and a storage destination directory, to thus generate a distribution list having respective pieces of distribution information registered therein; and a distribution module which sequentially reads distribution information from the distribution list and distributes the image data to respective other digital cameras, which constitute the members, on the basis of the read distribution information.

According to the present invention, image data captured by digital cameras constituting an image-sharing group can be shared by way of a network among the digital cameras.

The invention will be more clearly comprehended by reference to the embodiments provided below. However, the scope of the invention is not limited to these embodiments.

BRIEF DESCRIPTION OF THE DRAWINGS

Preferred embodiments of the present invention will be described in detail based on the following figures, wherein.

DETAILED DESCRIPTION OF THE PREFERRED EMBODIMENT

The best mode (hereinafter called an "embodiment") for carrying out the present invention will be described hereinbelow by reference to the drawings.

Figure 1:
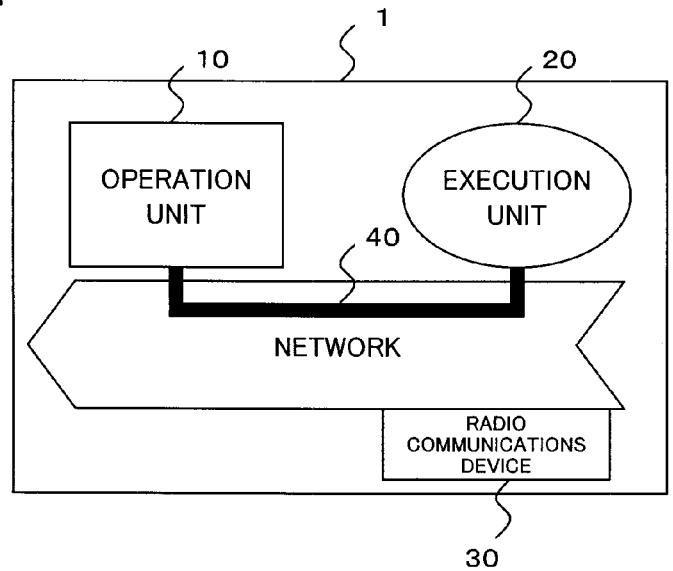
FIG. 1 is a view showing functional blocks of a digital camera according to an embodiment of the present invention.

FIG. 1 is a view showing functional blocks of a digital camera 1 according to an embodiment of the present invention. The digital camera 1 includes three primary components, an operation unit 10, an execution unit 20, and a radio communications device 30.

The operation unit 10 is a UI (User Interface) component used for establishing communication with the user, and controls a user interface, such as operation buttons used when the user operates the digital camera 1. The execution unit 20 is a component which integrates functions of the digital camera 1, such as a capturing function, a image data storage function, and the like. The operation unit 10 and the execution unit 20 establish mutual communication by way of an operation-side communications interface 103 and an execution-side communications interface 203, which will be described below, by use of a general-purpose communications protocol.

In the present embodiment, a PTP (Picture Transfer Protocol) is used as a protocol for installing the respective communications interfaces 103, 203, and a TCP/IP is used as a communications protocol which is used by the interfaces. The operation unit 10 and the execution unit 20 communicate with each other by way of exchanging a PTP command and a response thereto by way of a socket stream which serves as a communications channel 40.

Further, in order to establish communication with another digital camera, or the like, by way of a network, the digital camera 1 has the radio communications device 30. The digital camera 1 establishes radio communication with another digital camera, or the like, on the basis of a communications scheme of communications standards 802.11 (WiFi) by way of the radio communications device 30.

Figure 2:
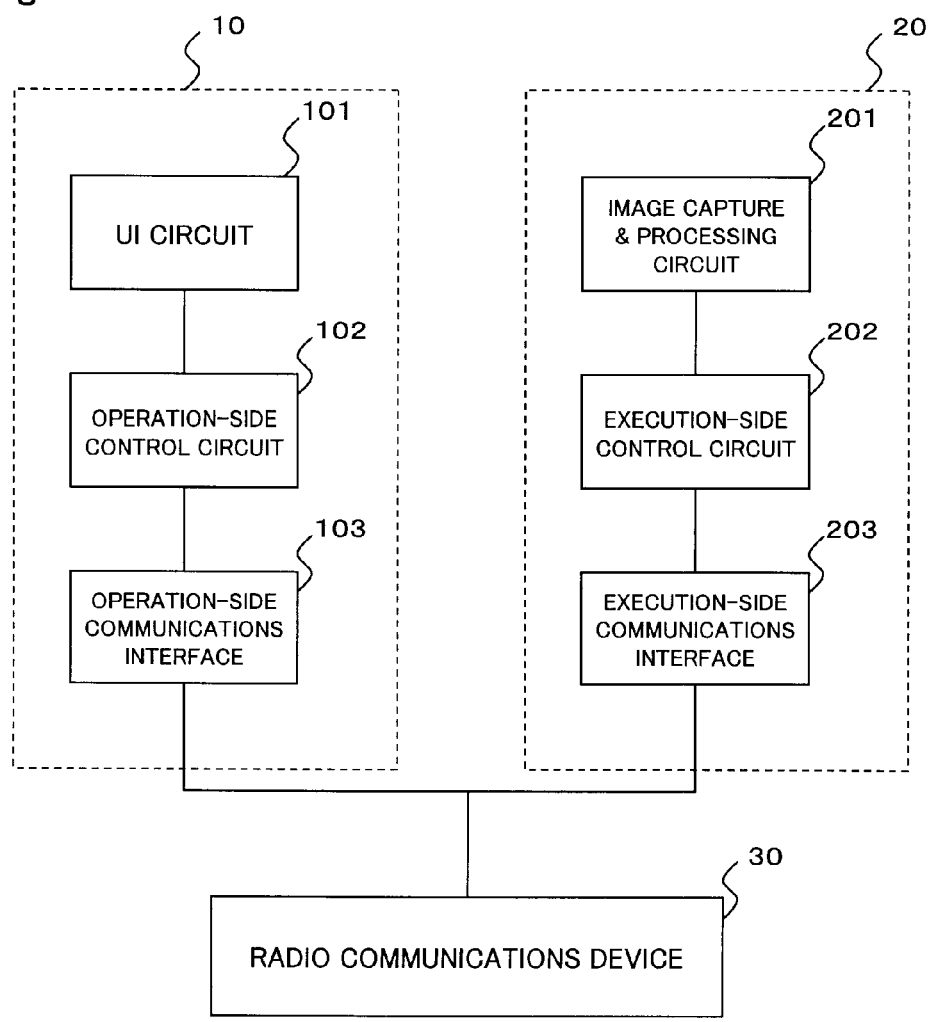
FIG. 2 is a functional block diagram showing in more detail an operation unit and an execution unit, which constitute the digital camera of the present embodiment.

FIG. 2 is a view showing further-detailed functional blocks of the operation unit 10 and those of the execution unit 20. The operation unit 10 includes a UI circuit 101 including operation buttons, such as a shutter button, a button used for switching among various capturing modes, and the like, and a display for displaying an image; an operation-side control circuit 102 for controlling the entirety of the operation unit 10; and the operation-side communications interface 103 for establishing communication with the execution unit 20 and communication with another digital camera, or the like, by way of a radio communications device.

The execution unit 20 includes a image capture & processing circuit 201 for effecting capturing operation; an execution-side control circuit 202 for controlling the entirety of the execution unit 20; and the execution-side communications interface 203 for establishing communication with the operation unit 10 and communication with another digital camera, or the like, by way of a radio communications device.

Figure 3:
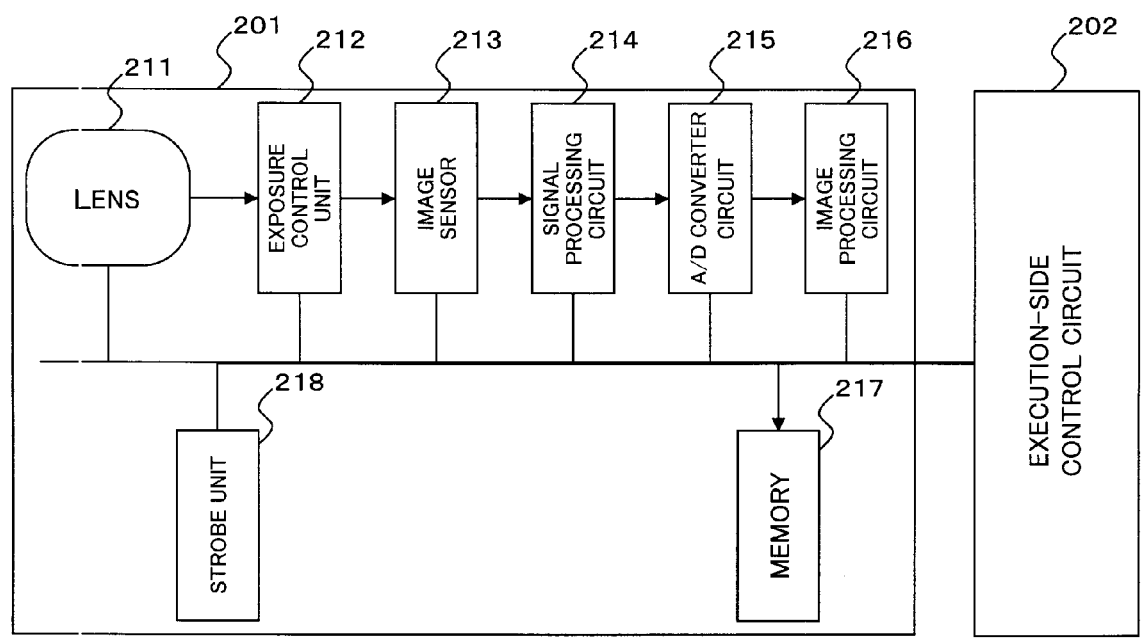
FIG. 3 is a functional block diagram showing in more detail a image capture & processing circuit of the execution unit that constitutes the digital camera of the present embodiment.

FIG. 3 is a functional block diagram showing in more detail the image capture & processing circuit 201 included in the execution unit 20. In FIG. 3, the quantity of light falling on an image after having passed a lens 211 is controlled by an exposure-side control mechanism 212, and a subject image is formed on an imaging screen of an image sensor 213. The image sensor 213 outputs a subject image, which has been formed by way of a predetermined clock signal, as an imaging signal to a signal processing circuit 214. The signal processing circuit 214 subjects the input imaging signal to signal processing such as brightness signal processing, color separation, and the like. An A/D converter circuit 215 converts the imaging signal, which has been subjected to signal processing, from an analog signal to a digital signal. The signal, which has undergone analog-to-digital conversion, is subjected to various image processing, such as gamma correction, in an image processing circuit 216, and the thus-processed signal is stored as image data in memory 217. A strobe unit 218 radiates a strobe light on a subject 2 as necessary.

In the digital camera configured as above, the operation-side control circuit 102 receives an operation command from the user by way of the UI circuit 101. The operation-side control circuit 102 outputs a control signal, which is responsive to the operation command, to the execution unit 20 by way of the operation-side communications interface 103. The execution-side control circuit 202 receives the control signal from the operation unit 10 by way of the execution-side communications interface 203, and controls the image capture & processing circuit 201 in accordance with the control signal, to thus perform capturing processing.

Figure 4A:
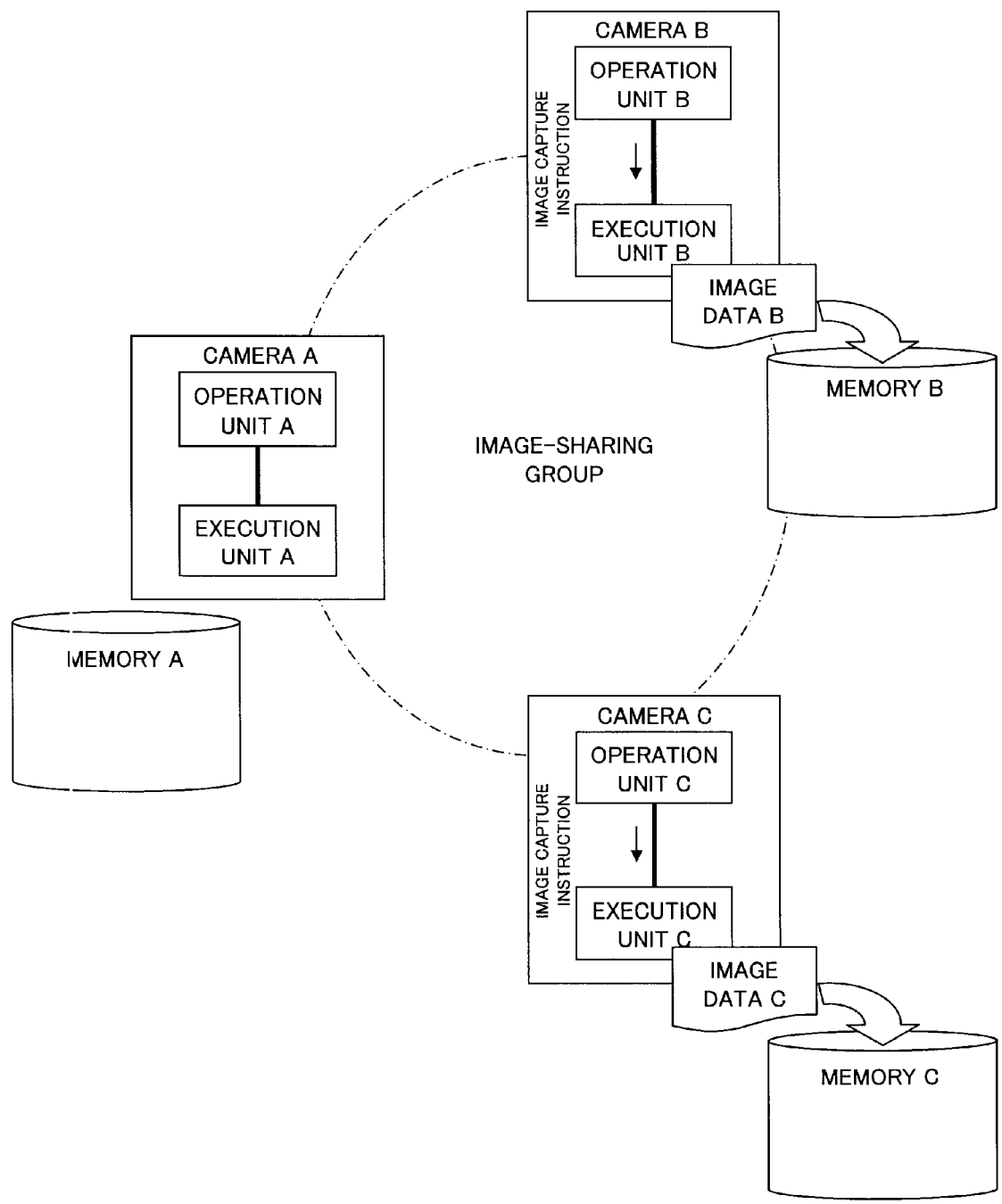
FIG. 4A is a view for describing processing procedures of an image-sharing system of the present embodiment.
Figure 4B:
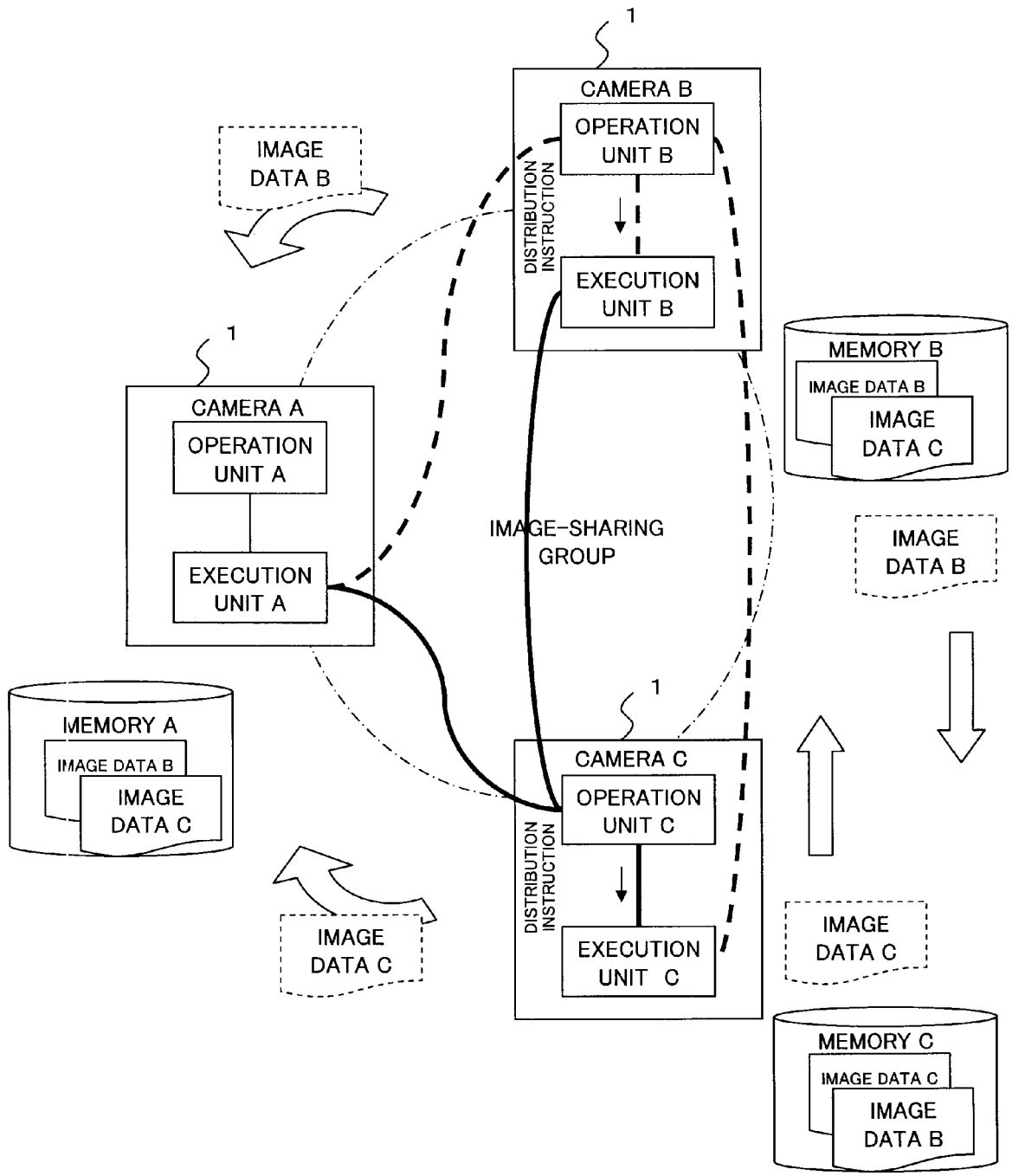
FIG. 4B is a view for describing processing procedures of the image-sharing system of the present embodiment.

In the present embodiment, the digital camera configured as above is prepared in numbers, to thus constitute an image-sharing group. The respective digital cameras are connected by way of the network to thereby constitute an image-sharing system. For instance, when capturing is performed in a case where the image sharing group is formed from cameras A to C to thus constitute an image-sharing system, each of the cameras performs processing, such as that shown in FIGS. 4A and 4B. In FIG. 4A, an execution unit B and an execution unit C perform capturing processing in accordance with a capturing command from the operation unit B and the operation unit C, whereby image data B and image data C are generated. The image data B are stored in memory B, and the image data C are stored in memory C. Subsequently, as shown in FIG. 4B, the operation unit B establishes connections with the execution unit A and the execution unit C, to thereby distribute the image data B to the camera A and the camera C. Meanwhile, the operation unit C establishes connections with the execution unit A and the execution unit B, to thereby distribute the image data C to the camera A and the camera B. Thus, the respective cameras A to C, which constitute the image-sharing group, share the image data captured by the respective cameras.

Processing procedures of the respective digital cameras in the image sharing system will be further described hereunder.

First, the user sets a user ID and an IP address in each of the digital cameras as a preparation for sharing an image. The user ID is an ID used for identifying a member in the image sharing group. For instance, user names of the owners of the respective digital cameras constituting the group can be used. The user registers the user name in each of the digital cameras by way of the UI circuit 101. The user ID does not need to be set every time an image is shared. It is better to retain the once-set user ID in the memory of the digital camera.

The user causes the digital cameras to capture number plates prepared in number equal to the cameras constituting the image-sharing group, to thus register IP addresses in the respective digital cameras. The number plates are boards numbered, e.g., 1, 2, 3, . . . .

More specifically, the user operates each of the cameras, to thus issue an IP address registration command to the operation unit of each of the cameras. Upon receipt of the registration command, the respective operation units 10 perform processing indicated by the flowchart shown in FIG. 5. In the following descriptions, an operation unit and an execution unit of a camera, which has captured a number plate numbered "n" ("n" is an integer falling within the range from 1 to N; N represents the total number of cameras constituting the image sharing group), are represented as an "operation unit [n]" and a "execution unit [n]."

Figure 5:
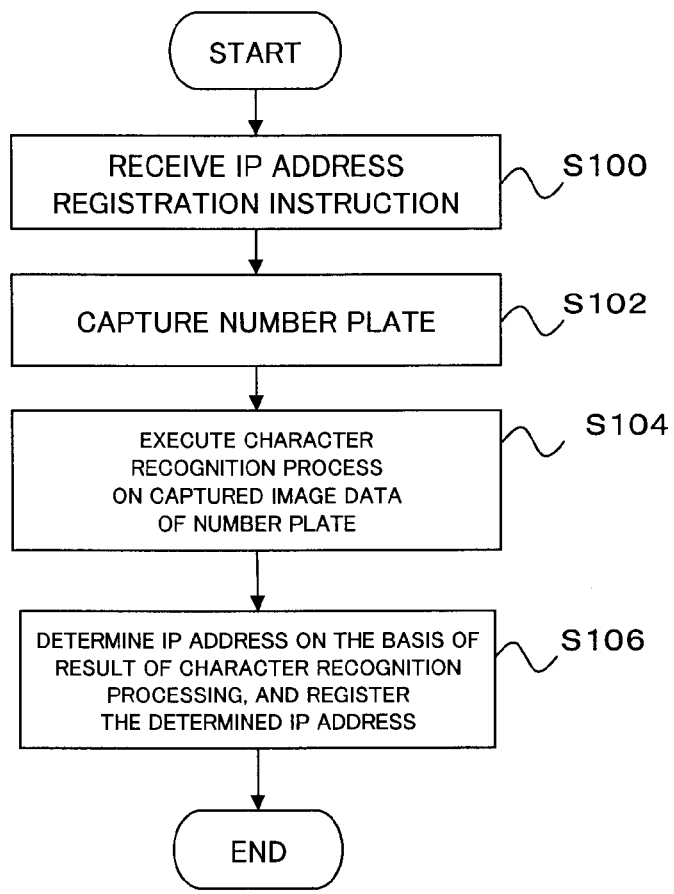
FIG. 5 is a flowchart showing processing procedures employed when each of the digital cameras registers an IP address.

In FIG. 5, the operation unit [n] receives an IP address registration command (S100), and causes the execution unit [n] to perform capturing in accordance with the command, to thus capture the number plate (S102). Next, the operation unit [n] receives the thus-captured image data from the execution unit [n] and subjects the image data to character recognition processing (S104). Further, on the basis of a result of processing, the number of the camera is specified, and an IP address corresponding to the number is determined. Subsequently, the number and the IP address are registered in memory (S106). It is better to employ a common character recognition technique, such as an OCR (Optical Character Recognition) technique or the like, for character recognition processing. For instance, image data pertaining to numbers captured by capturing the number plates have been stored in advance in association with those numbers. The degree of similarity between the image data and the image data acquired through capturing operation of the execution unit [n] is computed, to thereby determine a number responsive to image data having the highest degree of similarity as an assigned number.

An IP address responsive to the determined number is determined as follows. First, a network unit of the IP address is determined beforehand. In the case of IPv4, the network unit is defined as the upper 24 bits, and "169.254.0.*" is defined as the network unit. Numerals of each number are assigned to the host unit. In this case, on the assumption that the camera is caused to capture a number plate 1, "169.254.0.1" is registered as an IP address. By way of causing the camera to capture a number plate "3," "169.254.0.3" is registered as an IP address.

Figure 6:
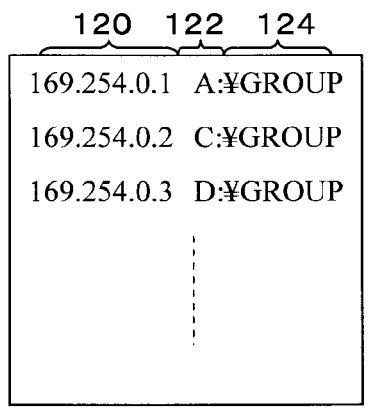
FIG. 6 is a view showing an example group list retained in each of the digital cameras.

As above, after a user ID and an IP address have been set in each of the cameras constituting the image-sharing group, the camera [1] having captured the number plate "1" generates a group list in accordance with the user command, and the group list is distributed to the other cameras constituting the image-sharing group. The group list is member information about the members constituting the image-sharing group. As shown in FIG. 6, the group list is a list of member information, wherein relations are shown among an IP address 120 of a camera which is to become a member, a drive letter 122 used for identifying a drive (storage device) where shared image data are stored, and a directory 124 showing a location where the shared image data are stored.

Figure 7:
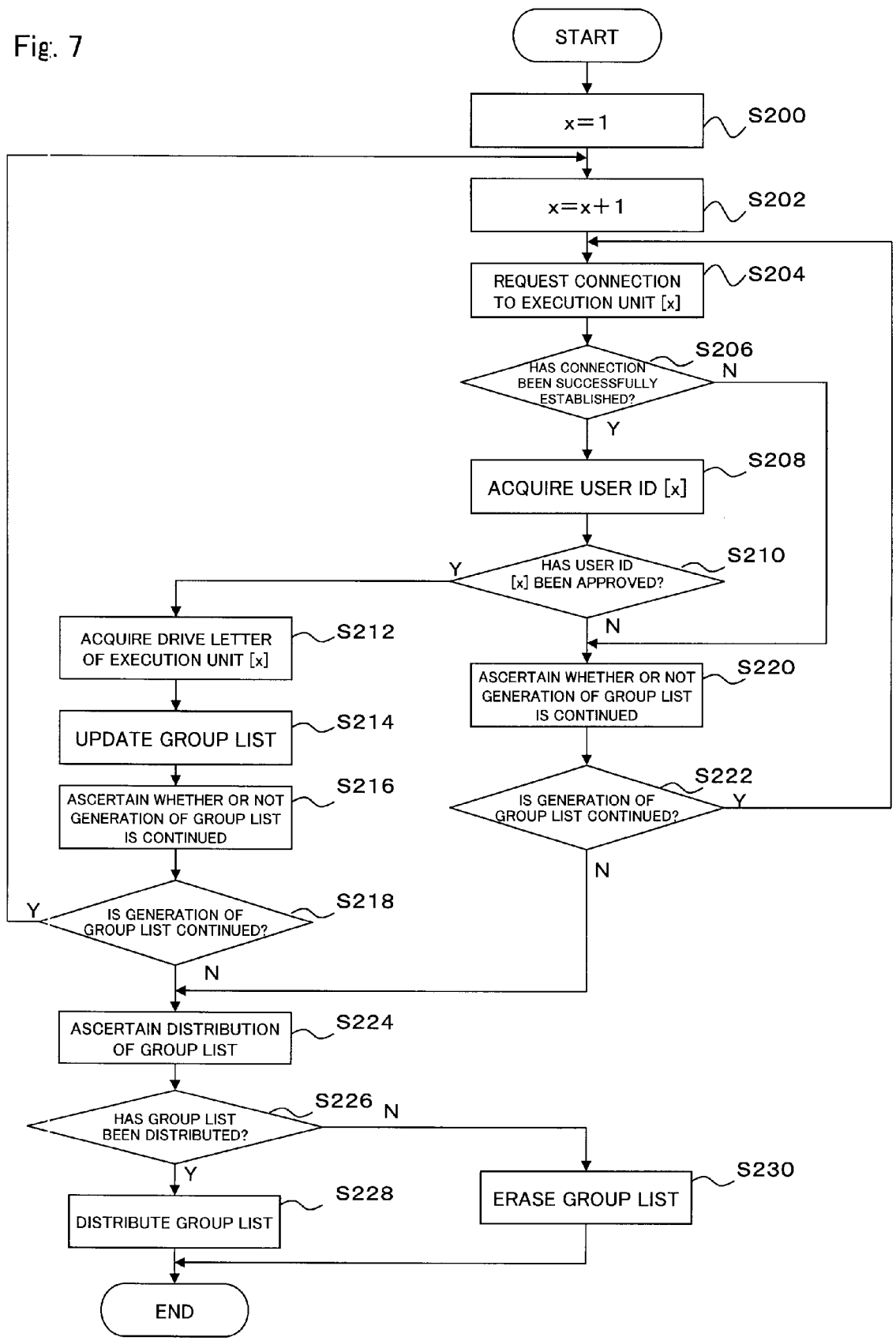
FIG. 7 is a flowchart showing processing procedures employed when the digital camera generates the group list.

The operation unit [1] of the camera [1] generates such a group list on the basis of a flowchart such as that shown in FIG. 7.

First, the operation unit [1] substitutes number "1" of the camera into a variable "x" (S200). The variable "x" is further incremented (by one) (S202). Next, the operation unit [1] makes a connection request to the execution unit [x] (S204). In other words, the execution unit [1] transmits to the network a request for a connection with an IP address [169.254.0.x] which is a destination of an access. Subsequently, when a connection with the execution unit [x] has attained success (a determination result made in S206 is affirmative "Y"), the operation unit [1] acquires a user ID [x] from the execution unit [x] (S208), to thus ascertain a user ID [x].

Ascertainment referred to herein is carried out to confirm that the user has connected with an intended camera constituting the image sharing group. The environment where the present embodiment is carried out is not intended solely to represent a closed space where only the cameras constituting the image-sharing group exist. The environment where the present embodiment is carried out is also intended to represent a public space where a plurality of radio-communicable cameras, or the like, other than the cameras constituting the image-sharing group exist. To these ends, when a connection has attained success as mentioned above, the user ID [x] is approved in order to cause the user to ascertain that the camera, which has attained success in establishing a connection, is an intended camera constituting the image-sharing group. The operation unit [1] displays a user ID[x], which has been acquired in S208, on a display or the like, to receive a command as to whether to approve the camera from the user by way of the UI circuit 101, to thus approve the user ID[x].

When the user ID[x] has been approved (a result of determination rendered in S210 is affirmative "Y"), the operation unit [1] acquires a drive letter of the drive for image-sharing purpose from the execution unit [x] (S212), to thus update the group list (S214). In short, the operation unit [1] generates member information, such as that shown in FIG. 6 on the basis of an IP address [169.254.0.x] responsive to the connected execution unit [x] and the acquired drive letter, and adds the thus-generated member information to the group list.

After having updated the group list, the operation unit [1] asks the user to ascertain whether or not generation of the group list is continued by way of the UI circuit 101 (S216). Specifically, the operation unit [1] ascertains whether or not another digital camera is additionally registered in the image-sharing group. When generation of the group list is continued as a result of ascertainment (a result of determination rendered in S218 is affirmative "Y"), processing subsequent to S202 is repeated. An attempt is made to make a connection with the execution unit [x] responsive to the incremented variable "x," to thereby try updating the group list.

When making a connection to the execution unit [x] has ended in failure (a result of determination rendered in S206 is negative [N]), and when the user ID [x] has not been approved (a result of determination rendered in S210 is negative [N]), the operation unit [1] asks the user to check whether to continue generation of the group list by way of the UI circuit 101, as in the case of S216 (S220). When generation of the group list is determined to be continued as a result of ascertainment (a determination result of S222 is affirmative "Y"), the operation unit [1] does not increment the variable "x," and again makes an attempt to establish a connection to the execution unit [x] responsive to the same variable "x," to thus try updating the group list.

When the configuration of the image-sharing group is completed after processing has been performed or when the configuration of the image-sharing group has been aborted, the operation unit [1] receives from the user a command to the effect that generation of the group list is completed (a result of determination rendered in S218 is negative "N," or a result of determination rendered in S222 is negative "N"). Subsequently, the operation unit [1] asks the user to ascertain whether or not the group list is distributed by way of the UI circuit 101 (S224). Specifically, the operation unit [1] asks the user to make sure whether or not the image is shared among the digital cameras described in the generated group list. When distribution of the group list is approved as a result of ascertainment (a result of determination rendered in S226 is affirmative "Y"), the operation unit [1] distributes the group list to the respective execution units connected to the operation unit [1] (S228). Put another word, the operation unit [1] causes the respective execution units 20 to write the distributed group list into RAM provided in each of the execution-side control circuits 202. The operation unit [1] is assumed to distribute the group list to the execution unit [1], as well.

When a result of ascertainment performed in S224 shows that the group list is not distributed (a result of determination rendered in S226 is negative "N"), the operation unit [1] erases the group list (S230).

Through the above processing procedures, the group list as shown in FIG. 6 is generated, and the thus-generated group list is distributed to the execution unit 20 of each of the digital cameras constituting the image-sharing group. The group list may be generated by use of, e.g. a personal computer, and transferred to the respective digital cameras rather than being generated by connecting the digital cameras to the network according to the above procedures.

Processing procedures employed when the digital camera of the present embodiment performs capturing will now be described by reference to the drawings.

Figure 8A:
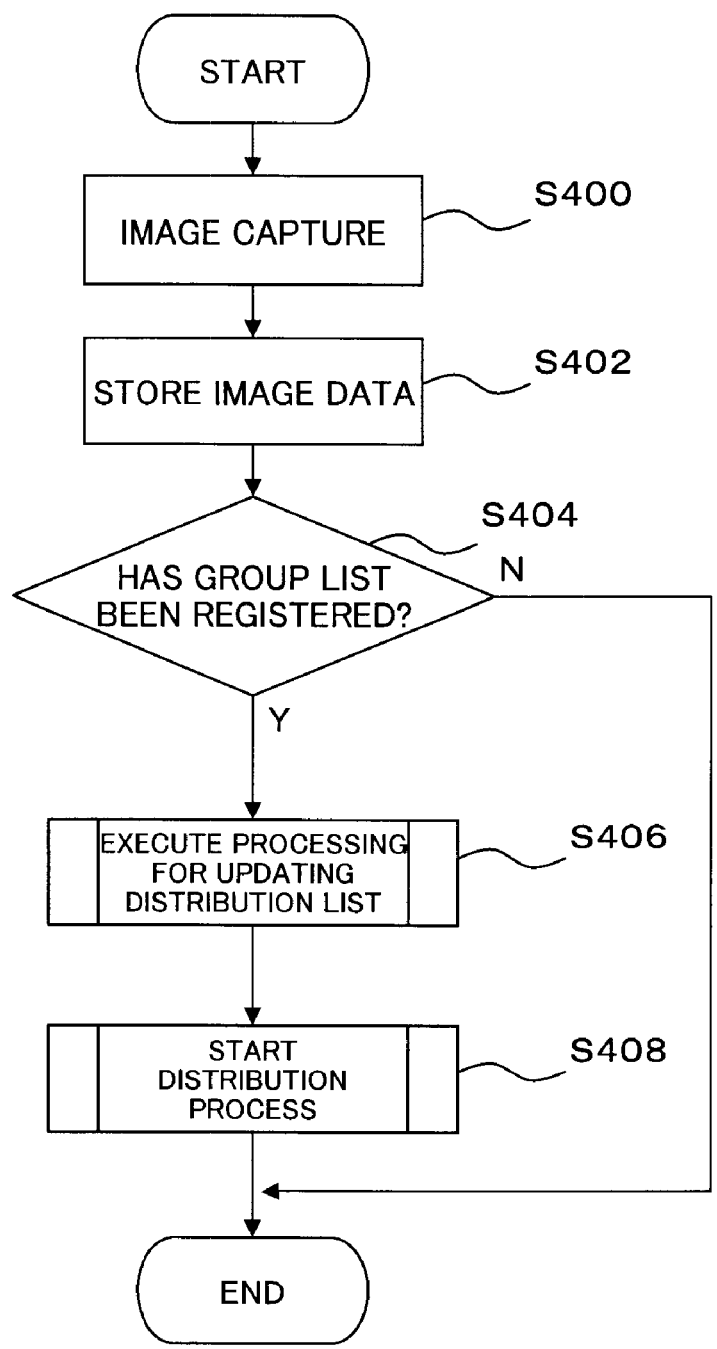
FIG. 8A is a flowchart showing processing procedures employed when the digital camera of the present embodiment performs capturing operation.
Figure 8B:
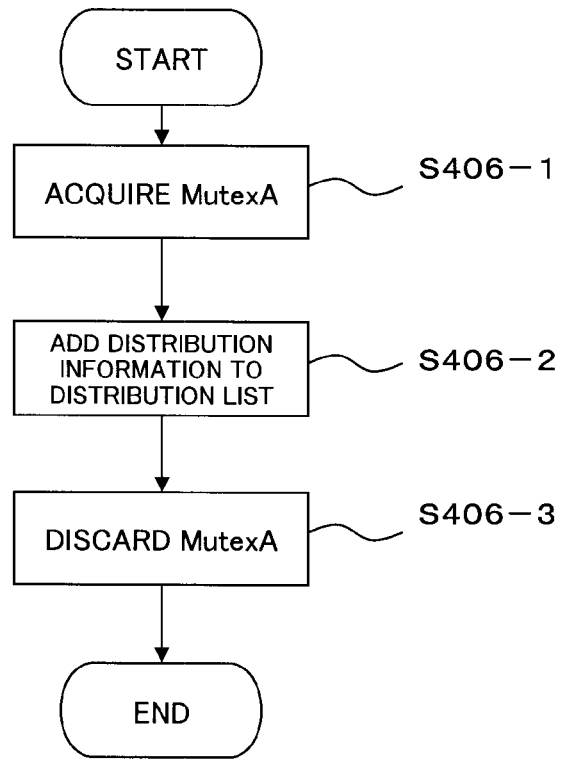
FIG. 8B is a flowchart showing procedures of update processing.

FIGS. 8A and 8B are flowcharts showing processing procedures of the operation unit 10 and those of the execution unit 20 performed when a capturing command is received.

Figure 9A:
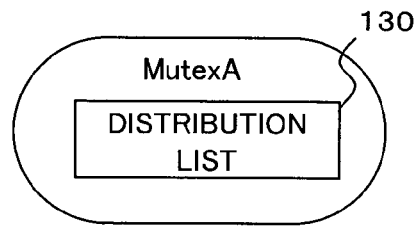
FIG. 9A is a view for describing Mutex used in exclusively handling a distribution list.

In FIG. 8A, upon receipt of the capturing command from the operation unit 10, the execution unit 20 captures a subject (S400), and stores the thus-acquired image data into memory 217 (S402). Next, the execution unit 20 ascertains whether or not a group list is registered. Specifically, the execution unit 20 checks whether or not the group list is written in RAM of the execution-side control circuit 202. When a result of ascertainment shows that the group list is registered (a result of determination rendered in S404 is affirmative "Y"), the operation unit 10 receives the result from the execution unit 20, and performs processing for updating the distribution list (S406). Next, the operation unit 10 starts a distribution process (S408). Writing of data to the distribution list, or the like, performed through updating of the distribution list must be carried out exclusively. For this reason, in the present embodiment, exclusive control is performed by use of Mutex (Mutual Exclusion: mutually-exclusive lock), which is one of well-known techniques for effecting exclusive control. The operation unit 10 acquires Mutex (hereinafter called "Mutex A") prepared for distributing a list, thereby exclusively writing data to the distribution list or the like. FIG. 9A shows a conceptual drawing of Mutex A. As shown in FIG. 9A, the operation unit 10 acquires Mutex A, whereby the distribution list is protected. During updating processing that is currently being performed, the distribution list 130 can be exclusively processed.

FIG. 8B is a flowchart showing procedures employed in processing for updating the distribution list. The operation unit 10 first acquires Mutex S (S406-1), to thus protect the distribution list from other processes. Subsequently, distribution information is added to the distribution list (S406-2). After addition of the distribution information, the operation unit 10 discards the acquired Mutex A (S406-3), and cancels protection of the distribution list.

Figure 10:
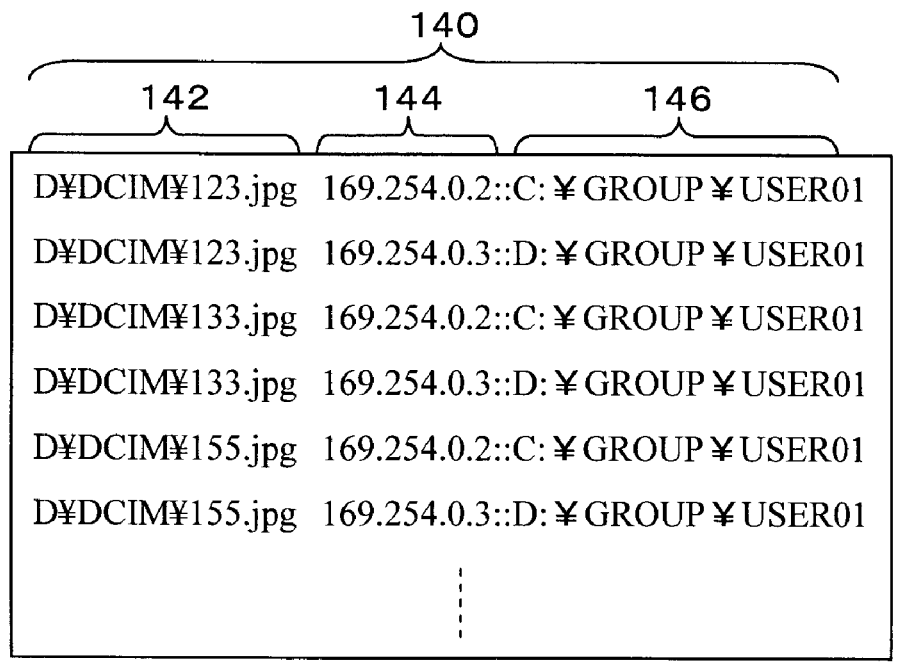
FIG. 10 is a view showing an example distribution list retained in each of the digital cameras.

The distribution information is information which relates a recorded location of image data to be distributed, a destination of the digital camera to which the image data are to be distributed, and a recorded location of the image data at the destination of distribution. The distribution list is a list where a group of pieces of distribution information are registered. In the present embodiment, when image data are generated through capturing, distribution information is generated for each of the other digital cameras constituting the image-sharing group. FIG. 10 shows an example distribution list. As shown in FIG. 10, distribution information 140 includes a recorded location 142 of image data to be distributed, an IP address 144 of the digital camera to which image data are to be distributed, and a recorded location 146 of image data in the digital camera located at the destination of distribution. In the present embodiment, a directory, whose file name is the user ID of the distribution source, is added to the drive of the digital camera located in the destination of distribution, and image data assigned to the user ID are stored in the directory.

A distribution process performed in S408 will now be described. In the distribution process, there is performed processing for distributing image data to the respective digital cameras constituting the image sharing group, on the basis of the distribution list.

Figure 11:
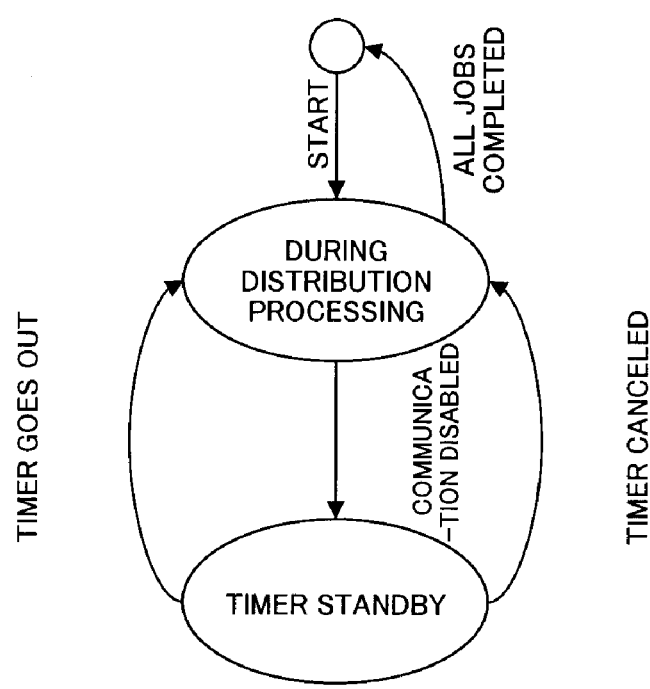
FIG. 11 is a view showing status transition of the distribution processes.

FIG. 11 shows the transition of a status of the distribution process. As shown in FIG. 11, in the distribution process, after the process has been started (startup), distribution processing is performed (distribution processing in progress). When establishing communication with a digital camera which is to become the destination of distribution has not been performed successfully (communication is disabled), waiting is performed for a given period of time (a timer standby status), and distribution processing is again initiated (a timer has expired). Even when a predetermined period has not elapsed, distribution processing is again initiated (a timer is canceled) as in the case of the digital camera, which is to be a destitution of distribution, having become communicable. Subsequently, when distribution the distribution list has been depleted of information, the distribution process determines that the distribution of all image data, which are to be distributed to all the digital cameras constituting the image-sharing group, has become completed, to thereby complete processing (all jobs completed).

Figure 9B:
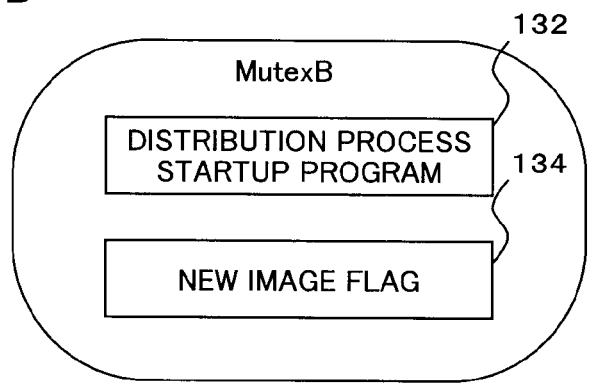
FIG. 9B is a view for describing Mutex employed in exclusively execution processing pertaining to a distribution process.

In the present embodiment, the distribution process is processing to be performed independently of capturing. Therefore, during the course of the image data being distributed through the distribution process, the operation unit 10 can issue a capturing command to the execution unit 20. Therefore, there is a possibility of new capturing being performed during processing of the distribution process or a possibility of pressing for starting the distribution process being newly performed during the course of the distribution process performing startup processing, to thus perform a new distribution process. Therefore, processing for starting the distribution process as well as updating the distribution list must be exclusively controlled. As in the case of updating of the distribution list, Mutex (Mutex for distribution process is hereinafter called Mutex B) is used to exclusively perform a distribution process, as well. FIG. 9B shows a conceptual drawing of Mutex B. As shown in FIG. 9B, the operation unit 10 acquires Mutex B, to thus protect a distribution process active flag 132 and a new image flag 134.

The distribution process active flag is a flag showing the status of the distribution process. Namely, as can be seen from the transition of a status shown in FIG. 11, the distribution process active flag 132 includes flags showing three statuses; namely, "ON" showing that the process is active; "OFF" showing that the process is inactive; and "SLEEP" showing that the process is in a timer standby status. The distribution process rewrites the flag according to the status of distribution processing. The operation unit 10 can ascertain the status of the distribution process by reference to the distribution process active flag.

The new image flag is a flag showing a necessity for performing distribution processing because new image data have been generated by capturing. As mentioned above, capturing and distribution processing are performed independently, and there is a case where new image data are generated during the course of distribution processing. Accordingly, after distribution processing, which is being currently performed, has been completed, the distribution process must ascertain whether or not there is a necessity for distributing image data. The new image flag is a flag to which the distribution process refers at that time. The distribution process ascertains whether or not the new image flag is "ON," thereby determining whether or not additional image data to be distributed are present.

Figure 12:
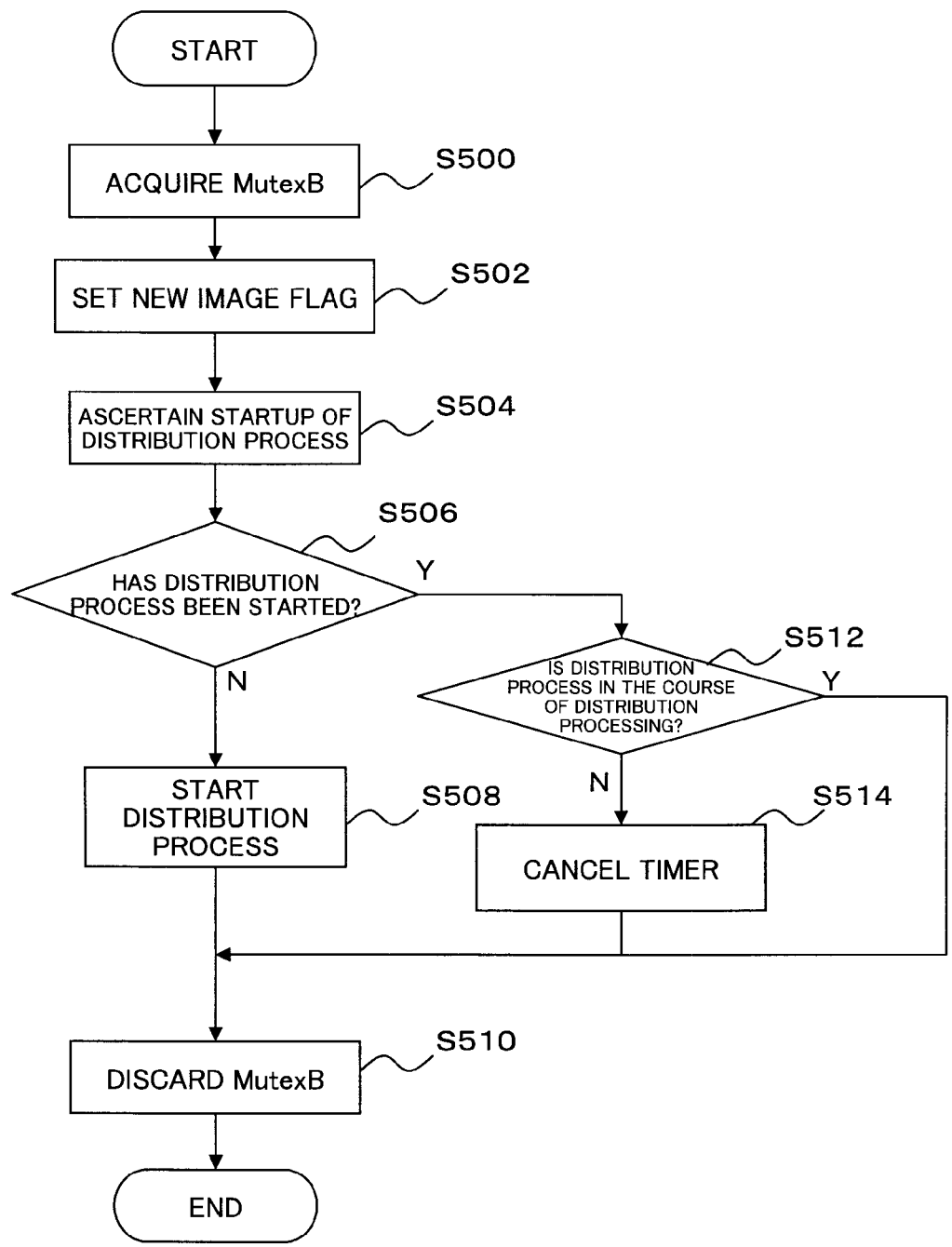
FIG. 12 is a flowchart showing procedures of startup processing of the distribution processes.

FIG. 12 is a flowchart showing procedures employed when the operation unit 10 starts a distribution process. In FIG. 12, the operation unit 10 acquires Mutex B used when an attempt is made to start the distribution process (S500). By way of acquisition of Mutex B, exclusive control is performed between the distribution process and the operation unit. Subsequently, the operation unit 10 activates the new image flag (S502). After having activated the new image flag, the operation unit 10 refers to the distribution process active flag, to thus make sure whether or not the distribution process is now active (S504). If the distribution process active flag is determined to be "OFF" as a result of ascertainment, the distribution process is determined not to be active (a result of determination rendered in S506 is negative "N"), the operation unit 10 activates the distribution process (S508), to thus discard Mutex B acquired in S500 (S510) and initiate distribution processing.

In the meantime, when the distribution process active flag is not "OFF," the distribution process is determined to be active (a result of determination rendered in S506 is affirmative "Y"), and the operation unit 10 further refers to the distribution process active flag, to thereby make sure whether or not distribution processing is being performed in the active distribution process. Consequently, if the distribution process active flag is "ON," the distribution process is determined to be in the course of distribution processing (a result of determination rendered in S512 is affirmative "Y"), and Mutex B is discarded (S510). In contrast, when the distribution process active flag is "SLEEP," the operation unit 10 determines that the distribution process is in a timer standby status (a result of determination rendered in S512 is negative "N"), and cancels the timer (S514). Subsequently, the operation unit 10 discards the Mutex B acquired in S500 (S510).

Through processing mentioned above, distribution processing is not activated doubly, and distribution processing can be exclusively performed. Contention among shared resources (image data, a distribution list, and the like) is prevented, and capturing and distribution processing can be carried out independently.

Subsequently, procedures of distribution processing of the distribution process will be described by reference to the flowcharts shown in FIGS. 13A and 13B.

Figure 13A:
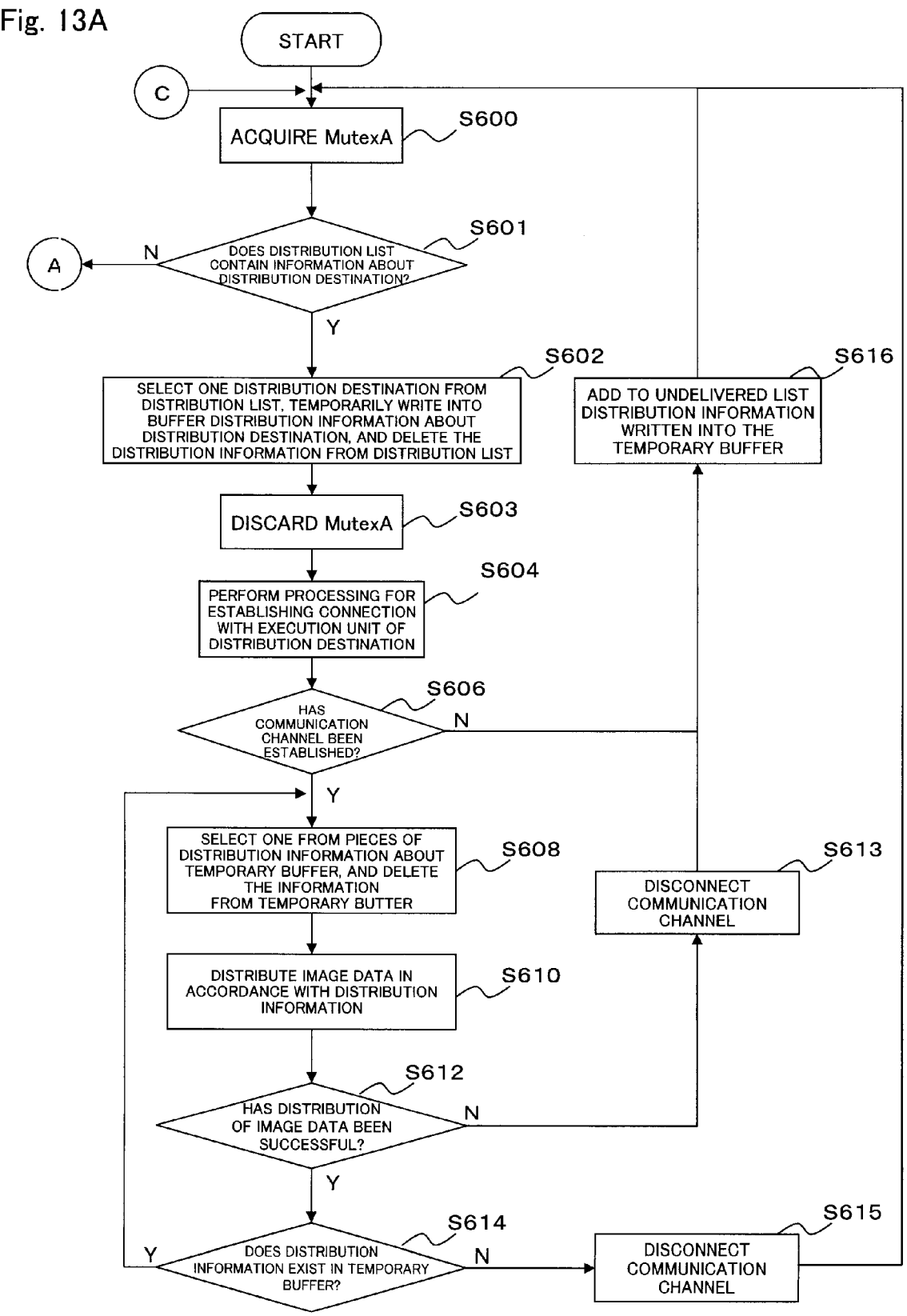
FIG. 13A is a flowchart showing procedures of distribution processing of the distribution processes (Part 1)

In FIG. 13A, after acquisition of Mutex A (S600), the distribution process ascertains whether or not distribution information is present by reference to the distribution list. When distribution information is present (a result of determination rendered in S601 is affirmative "Y"), the distribution process selects one from the destinations of distribution (i.e., one IP address to become a destination of distribution from IP addresses) by reference to distribution information existing in the distribution list, to thus read all pieces of distribution information responsive to the destination of distribution. The thus-read all pieces of distribution information are temporarily written into a buffer, and all the read pieces of distribution information are deleted from the distribution list (S602), to thereby discard Mutex A (S603). Next, the distribution process performs processing for making a connection to the execution unit 20 of the destination of distribution selected in S602 (S604). Consequently, when a communication channel has been successfully established with the execution unit 20 (a result of determination rendered in S606 is affirmative "Y"), the distribution process selects one from the pieces of distribution information temporarily written in the buffer in S602, and the thus-selected distribution information is temporarily deleted from the buffer (S608). The distribution process extracts image data from the recorded location of the image data, which is indicated by the selected distribution information; distributes the thus-extracted image data to the execution unit 20 that is the destination of distribution shown by the distribution information; and copies the image data in a recording location of the execution unit 20 (S610).

Consequently, when distribution of image data has attained success (a result of determination rendered in S612 is affirmative "Y"), the distribution process determines whether or not distribution information still temporarily remains in the buffer (S614). When distribution information temporarily remains in the buffer (a result of determination rendered in S614 is affirmative "Y"), the distribution process repeats processing from S608. In contrast, when the distribution information does not temporarily remain in the buffer (a result of determination rendered in S614 is negative "N"), the distribution process disconnects the communications channel with the execution unit 20 (S615), and processing is repeated from S600. When distribution of image data is determined to have ended in a failure as a result of determination rendered in S612 (a result of determination rendered in S612 is negative "N"), the distribution process disconnects the communications channel with the execution unit 20 (S613), and adds the failed distribution information to an undistributed list (S616). When the next execution unit is present, the distribution process tries communicating with the execution unit.

When establishing the communications channel with the execution unit 20 has ended in a failure in S606 (a result of determination rendered in S606 is negative "N"), the distribution process writes the distribution information, which has temporarily been written in the buffer, into the undistributed list (S616). Processing is repeated from S600.

Subsequently, when distribution information is not present in the distribution list (a result of determination rendered in S601 is negative "N"), the distribution process further performs processing based on the flowchart shown in FIG. 13B.

Figure 13B:
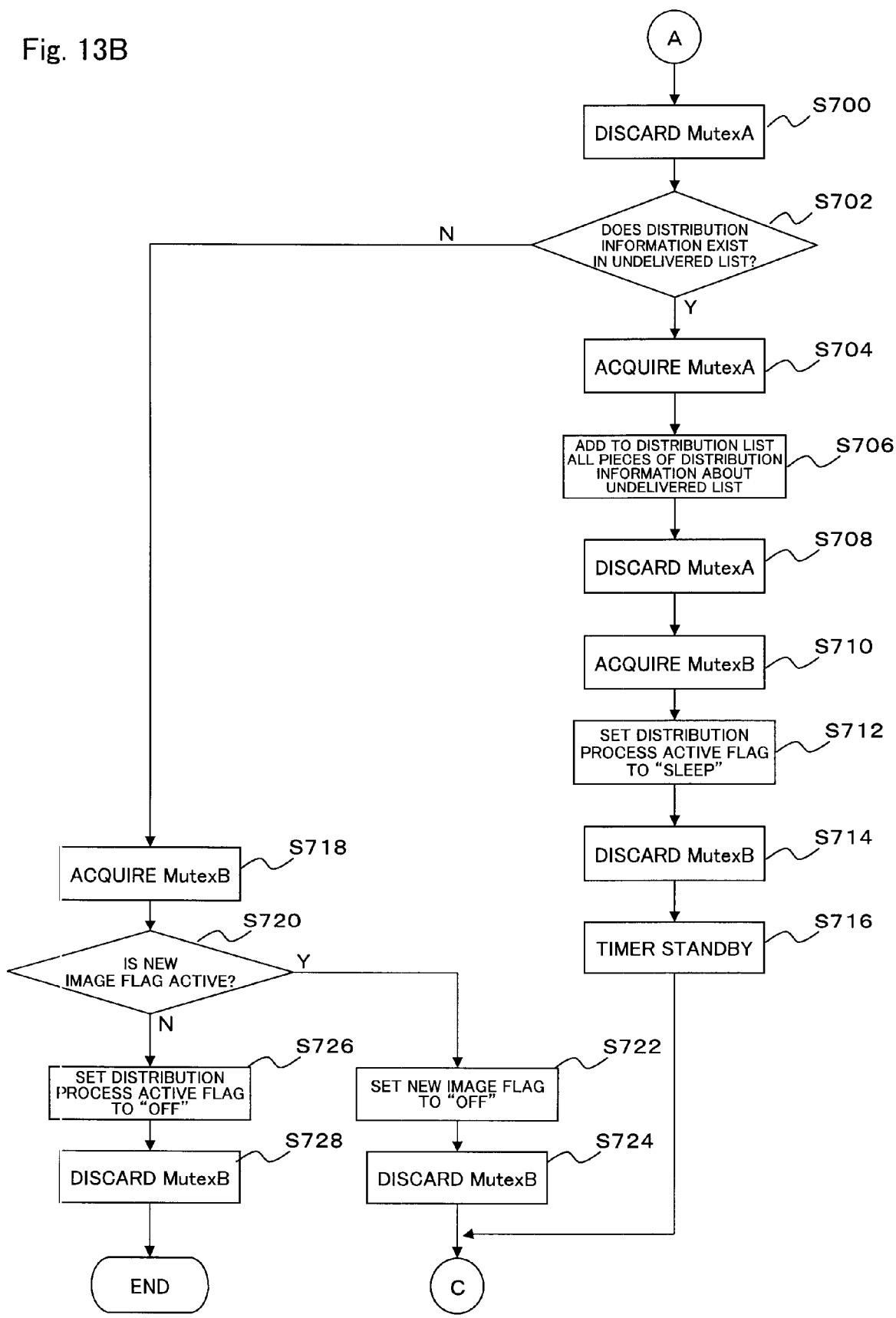
FIG. 13B is a flowchart showing procedures of distribution processing of the distribution processes (Part 2)

In FIG. 13B, when distribution information is not present in the distribution list, the distribution process discards Mutex A (S700), and then determines whether or not distribution information is present in the undistributed list (S702). Consequently, when distribution information is present in the undistributed list (a result of determination rendered in S702 is affirmative "Y"), the distribution process acquires Mutex A (S704); again writes all pieces of distribution information, which are present in the undistributed list, into the distribution list (S706); and discards Mutex A (S708). Further, after having acquired Mutex B (S710), the distribution process rewrites the distribution process active flag into "SLEEP" (S712), and discards Mutex B (S714). Thus, in order to try communication after lapse of a predetermined period of time, the distribution process per se activates the timer, to enter a timer standby status (S716). After elapse of the time or cancellation of the timer, the distribution process again iterates processing subsequent to S600 shown in FIG. 13A.

When the distribution information is not present in the undistributed list (a result of determination rendered in S702 is negative "NO"), the distribution process acquires Mutex B (S718), and then determines whether or not the new image flag is ON (S720). When the new image flag is ON (a determination of result rendered in S720 is affirmative "Y"), capturing is newly performed during distribution processing, and new image data to be distributed are determined to have been generated. After the new image flag has been changed to "OFF" (S722), Mutex B is discarded (S724). Processing is again iterated from S600 shown in FIG. 13A. When the new image flag is determined to be "OFF" in S720 (a result of determination rendered in S720 is negative "N"), the distribution process determines that image data to be distributed are not present, sets the distribution process active flag to "OFF" (S726), and discards Mutex B (S728). Thus, the process is terminated.

As mentioned above, among the pieces of distribution information which are present in the distribution list, the distribution information that has been failed to be distributed is temporarily saved in the distribution process. Remaining distribution information which is still present in the distribution list is subjected to distribution processing in a prioritized manner. After distribution processing of all pieces of distribution information present in the distribution list has been tried, the pieces of distribution information saved in the undistributed list are again written into the distribution list, and an attempt is again made to perform distribution processing after elapse of a predetermined period of time. Thereby, even when the digital camera having performed capturing cannot communicate with the other digital cameras constituting the image-sharing group and has not successfully distributed the image data, the digital camera having performed capturing tries distributing image data until the image data are distributed, and the digital cameras constituting the image-sharing group can reliably share the image data.

When undistributed image data still remain because the digital camera constituting the image-sharing group is unable to communicate with the other digital cameras due to the digital camera being located at a distance, an LED lamp of the digital camera is illuminated to thus inform the user of remaining of undistributed image data. Thereby, the user can locate the respective digital cameras, which constitute the image-sharing group, closely, to thus again perform distribution processing.

A command from the user pertaining to erasure of the generated group list may be granted only when distribution information is not present in the distribution list. Moreover, when the group list is erased from the digital camera, the digital camera may erase the group lists in the other digital cameras constituting the image-sharing group.

Figure 14:
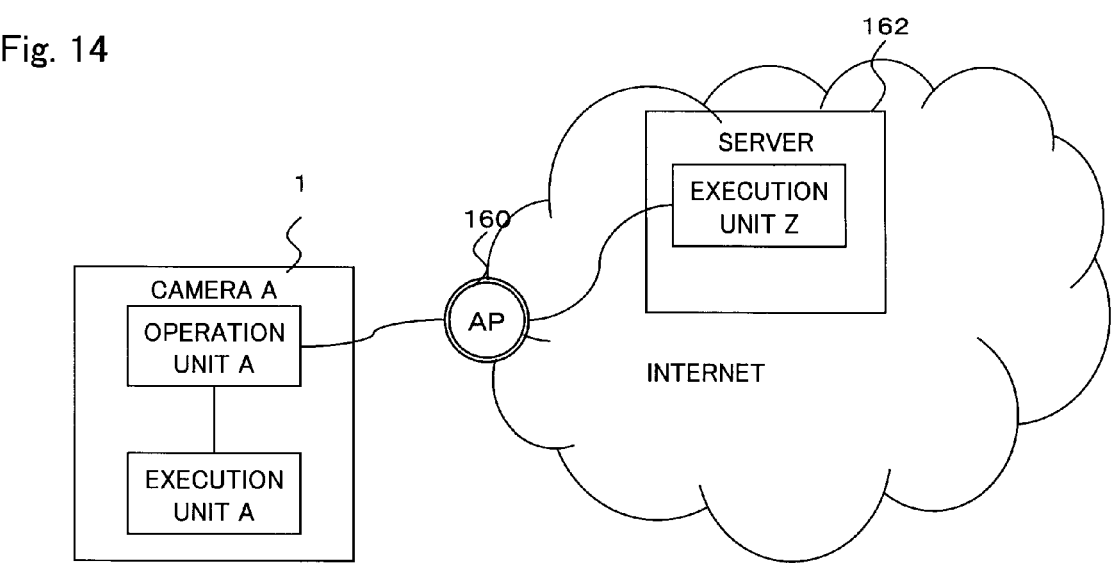
FIG. 14 is a view showing the system configuration of the image sharing system according to a modification of the present embodiment.
Figure 15:
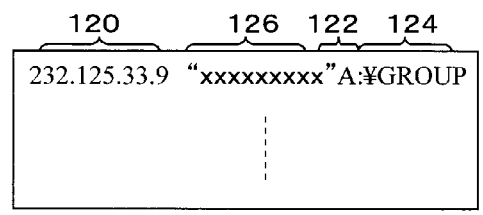
FIG. 15 is a view showing an example group list retained in a digital camera according to the modification.

FIG. 14 is a view showing a system configuration according to a modification of the present embodiment. In FIG. 14, an access point (AP) 160 is a relay point used when the digital camera 1 connects with the Internet. A server 162 is equipped with an execution unit. Thus, as a result of the server 162 in the Internet being equipped with the execution unit, the digital camera (operation unit A) can access a server (an execution unit Z) of the Internet by way of the AP 160. The execution unit Z provided in the server is incorporated into the image sharing group as in the case of the embodiment, whereby the user can automatically transfer the image data captured by the digital camera to a storage device over the Internet. In the modified embodiment, for instance, a group list has been prepared in advance by way of a personal computer, or the like, and the thus-prepared list may be transferred to the digital cameras. At this time, as shown in FIG. 15, identification information 126, such as a password and a user name, which is required when the digital camera 1 makes a connection to the AP 160, may have been registered in the group list in association with the IP address 120 of the destination of transfer. Thereby, labor imposed on the user, such as entry of a password required every time the digital camera 1 is connected to the AP 160, can be omitted.

When captured image data cannot be recorded because of a deficiency in memory capacity of the digital camera, processing pertaining to S402 shown in FIG. 8A may be omitted, to thus distribute an image. In the present embodiment, since all pieces of image data have been transferred to the other digital camera or a server over the Internet, a group list is referred to at a point in time when space has arisen in the memory of the digital camera, so that the image data captured by any of the members constituting the image sharing group can be readily acquired.

Figure 16:
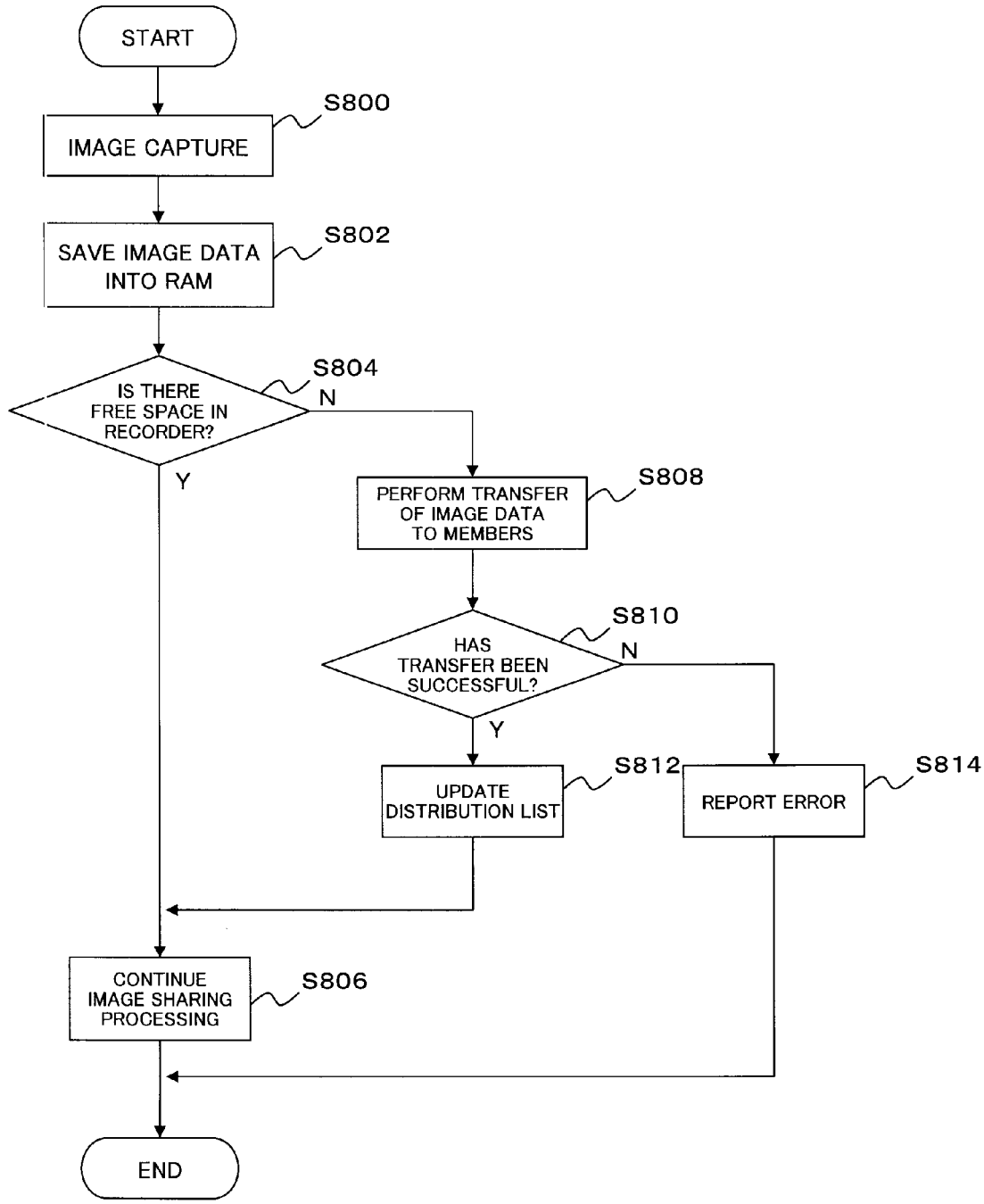
FIG. 16 is a flowchart showing procedures of processing for transferring image data to another member when memory capacity is deficient in connection with the modification of the present embodiment.

When the memory capacity is deficient, processing for transferring data to another member may be performed according to, e.g., a flowchart shown in FIG. 16.

In FIG. 16, after having performed capturing (S800), the digital camera saves the thus-acquired image data in RAM (S802). Subsequently, a determination is made as to whether or not a recorder of the digital camera has capacity sufficient for recording the image data (S804). If a result of determination shows that the memory capacity is available, image-sharing processing is continued (S806); namely, processing subsequent to S402 shown in FIG. 8A is performed. In contrast, when the capacity of the recorder is deficient, the digital camera refers to the group list, to thus select any one from the members and perform processing for transferring the image data to the member (S808). Consequently, when transfer of the image data has ended in a failure (a result of determination rendered in S810 is negative (N)), the digital camera displays a message to this effect on a screen, to thus inform the user of an error of a failure in transfer of the image data (S814). In contrast, when transfer of the image data has achieved success (a result of determination rendered in S810 is positive "Y"), the digital camera performs processing for updating the distribution list in order to acquire, from the destination of distribution, the image data having been transferred after occurrence of a space in memory capacity (S812).

Figure 17:
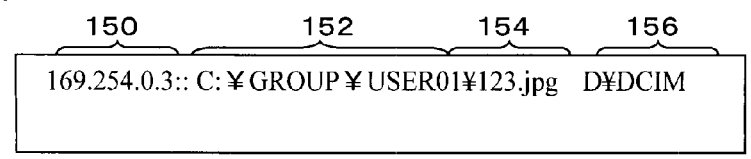
FIG. 17 is a view showing an example of transfer information registered in the distribution list.

By way of processing performed in connection with S812, the transfer information shown in FIG. 17 is, for instance, registered in the distribution list. As shown in FIG. 17, the transfer information shows an IP address 150 of a communications device which is to be a destination of distribution of image data and has a recorder such as a digital camera; a drive letter and directory name 152 pertaining to a destination where transferred image data are stored; a file name 154 of the transferred image data; and a drive letter and directory 156 pertaining to a destination where the image data acquired from the destination of transfer are stored. After a space has arisen in the capacity of the storage device of the digital camera that have captured the image data, the digital camera specifies the destination where the IP address of the destination of transfer and image data are stored, by reference to the transfer information shown in the distribution list, to thus acquire the image data from the destination of transfer. Similarly, the destination where the acquired image data are stored is specified by reference to the transfer information, and the image data are again stored in the storage device of the digital camera that has captured the image data. Thus, even when the digital camera having performed capturing cannot record image data, the image data can be temporarily saved in another digital camera. Moreover, so long as the transfer information has been registered in advance in the distribution list, the digital camera can readily acquire the image data captured through capturing from the destination of transfer when a space has arisen in memory capacity, and can store the image data into a recorder of that digital camera.

The invention has been described in detail with particular reference to certain preferred embodiments thereof, but it will be understood that variations and modifications can be effected within the spirit and scope of the invention.

PARTS LIST 1 digital camera
2 subject
10 operation unit
20 execution unit
101 UI circuit
102 operation-side control circuit
103 operation-side communications interface
120 IP address
122 drive letter
124 directory
126 identification information
130 distribution list
132 active flag
134 image flag
140 distribution information
142 recorded location
144 IP address
146 recorded location
150 IP address
152 directory name
154 file name 156 directory
160 access point
162 server
201 image capture and processing circuit
202 execution-side control circuit
203 communications interface
203 execution-side communications interface
211 lens
212 exposure-side control mechanism
213 image sensor
214 signal processing circuit
215 A/D converter circuit
216 image processing circuit
217 memory
218 strobe unit
30 radio communications device
40 communications channel
A execution unit
B execution unit
C execution unit
S100 IP address registration command
S102 capture the number plate
S104 character recognition processing
S106 memory
S200 variable
S202 incremented
S204 execution unit
S206 determination result
S208 execution unit
S210 determination
S212 execution unit
S214 group list
S216 generation of group list
S218 determination
S220 generation of group list
S222 determination
S224 group list
S226 determination
S228 operation unit
S230 group list
S400 subject
S402 stores data into memory
S404 determination
S406 distribution list
S406-1 acquires Mutex S
S406-2 distribution list
S406-3 acquired Mutex A
S408 distribution process
S500 distribution process
S502 image flag
S506 determination rendered
S508 distribution process
S510 discard Mutex B
S510 Mutex B is discarded
S512 determination rendered
S512 determination rendered
S514 timer
S600 Mutex A
S601 determination rendered
S602 determination rendered
S603 discard Mutex A
S604 distribution selected
S606 determination rendered
S608 buffer
S610 recording location
S612 determination rendered
S613 disconnects the communications channel
S614 buffer
S615 execution unit
S616 undistributed list
S700 discards Mutex A
S702 undistributed list
S704 acquires Mutex A
S706 distribution list
S708 discards Mutex A
S710 acquires Mutex B
S712 sleep
S714 discards Mutex B
S716 timer standby status
S718 acquires Mutex B
S720 image flag on
S722 image flag off
S724 Mutex B discarded
S726 active flag off
S728 discards Mutex B
S800 capturing
S802 RAM
S804 image data
S806 image-sharing processing
S808 image data to member
S810 determination rendered
S812 memory capacity
S814 image data
Z execution unit

The invention claimed is:

1. A digital camera which shares, within an image-sharing group by way of a network, image data captured by digital cameras constituting members of the image-sharing group, the digital camera comprising:
   an imaging circuit for outputting image data obtained by capturing a subject;
   a distribution list generation module which generates for each of the members of the group, every time image data are output from the capturing circuit, distribution information, including a storage source directory, a distribution destination address, and a storage destination directory, all pertaining to the image data, by reference to a group list where member information is registered for each of the members, including a distribution destination address and a storage destination directory, to thus generate a distribution list having respective pieces of distribution information registered therein; and
   a distribution module which sequentially reads distribution information from the distribution list and distributes the image data to respective other digital cameras, which constitute the members, on the basis of the read distribution information.

2. The digital camera according to claim 1, wherein, when image data based on read distribution information have not been successfully distributed, the distribution module saves the distribution information in an undistributed list, and again tries to effect distribution in connection with the distribution information saved in the undistributed list after having attempted distribution with regard to all pieces of distribution information registered in the distribution list.

3. An image-sharing method for sharing, by way of a network and within an image sharing group, image data captured by digital cameras constituting members of the image-sharing group, the method comprising:
   a distribution list generation step of generating, for each of the members of the group, every time image data are output from the capturing circuit, distribution information, including a storage source directory, a distribution destination address, and a storage destination directory, all pertaining to the image data, by reference to a group list where member information is registered for each of the members, including a distribution destination address and a storage destination directory, to thus generate a distribution list having respective pieces of distribution information registered therein; and a distribution step of sequentially reading distribution information from the distribution list and distributing the image data to respective other digital cameras, which constitute the members, on the basis of the read distribution information.

* * * * *